Figure 1:
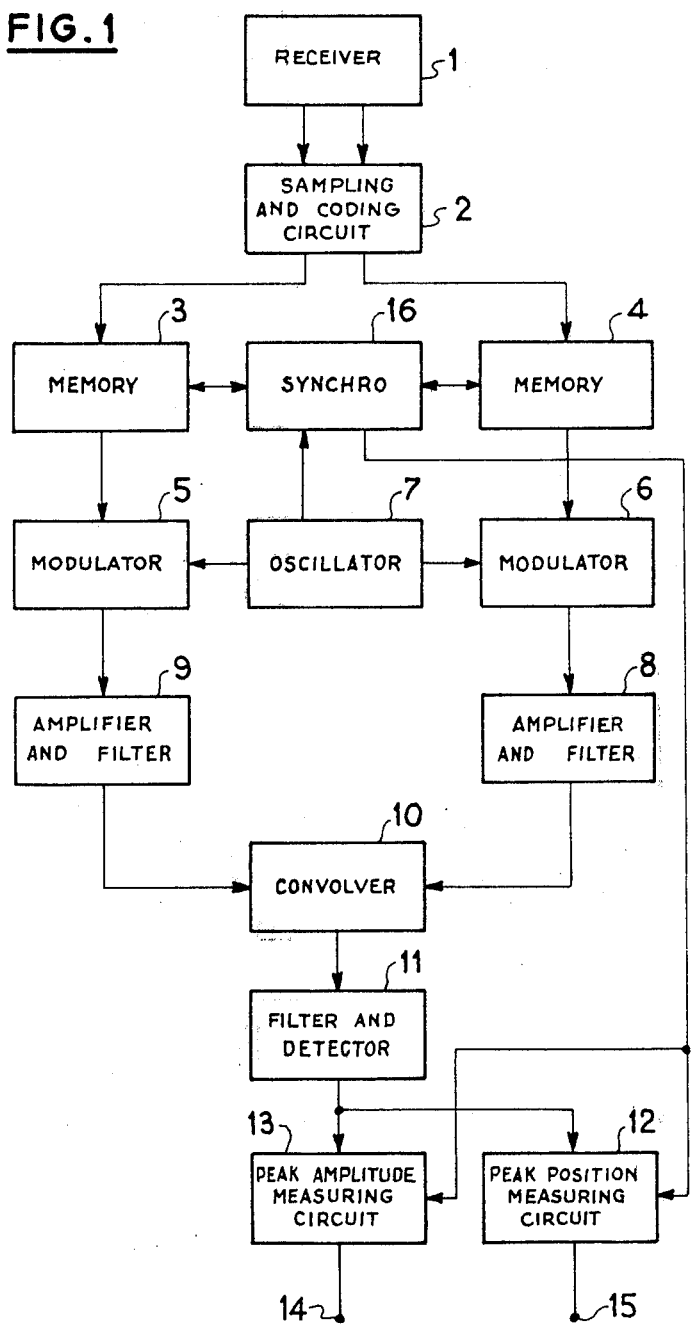

United States Patent [19]

Beauvais et al.

[11] 4,115,865

[45] Sep. 19, 1978

[54] HIGH-SPEED CORRELATING DEVICE

[75] Inventors: Thierry Beauvais; Philippe Souchay, both of Paris, France

[73] Assignee: Thomson-CSF, Paris, France

[21] Appl. No.: 785,300

[22] Filed: Apr. 6, 1977

[30] Foreign Application Priority Data

Apr. 9, 1976 [FR] France ................................. 76 10564

[51] Int. Cl.² .......................... G06F 15/34; G06G 7/19
[52] U.S. Cl. ................................. 364/604; 324/77 H; 340/347 DA; 364/821
[58] Field of Search ........................... 324/77 G, 77 H; 343/100 CL; 364/728, 604, 819–822

[56] References Cited

U.S. PATENT DOCUMENTS

| 2,914,762 | 11/1959 | Gross et al. | 235/181 X |
|---|---|---|---|
| 3,202,990 | 8/1965 | Howells | 235/181 X |
| 3,399,299 | 8/1968 | Nichols | 235/181 X |
| 3,596,182 | 7/1971 | Menard | 235/181X |
| 3,750,152 | 7/1973 | Waful | 235/181 X |
| 3,925,653 | 12/1975 | Otto | 235/181 |

FOREIGN PATENT DOCUMENTS 1,524,301   9/1970   Fed. Rep. of Germany ........... 235/181

*Primary Examiner*—Felix D. Gruber
*Attorney, Agent, or Firm*—Cushman, Darby & Cushman

[57] ABSTRACT

The invention relates to high-speed correlating arrangements. Input memories receive the signals to be correlated in the form of successions of samples. At read-out of samples in the memories, the time scale of one of the signals is reversed and the two series of samples are used to modulate a wave supplied by an oscillator. The two modulated carriers are applied to an electroacoustic convolver from which, after detection and filtering, the correlation function of the input signals is obtained.

9 Claims, 5 Drawing Figures

HIGH-SPEED CORRELATING DEVICE

The invention relates to high-speed correlating devices intended for processing fast, short signals, such as those coming from a receiver of a radar system or of another electromagnetic system.

To process fast signals, in particular transient signals, recourse is normally had to methods involving digital conversion and storage. As a first step, the signals are stored and the problem then arises of the delayed measurement of the magnitudes by which they are characterised. The correlation function is one such magnitude which has to be calculated and it calls for special calculating methods when a short processing time is required.

Consideration might be given to calculating the correlation function directly in digital form, point by point, from the stored information. However, calculation of this nature calls for a large number of processing circuits and for a large number of operations which take up a great deal of calculating time when a large number of points are required for the correlation function.

In the intended application, the correlator is intended to operate with short, repetitive signals arriving at a high rate. High speed and wide pass-band performance is particularly required from the system and this rules out the use of calculation in digital form, which is too slow and too costly in the present state of the art.

One object of the invention is thus the production of an arrangement for processing signals by correlation which is fast and has a wide pass-band.

Another object of the invention consists in producing a correlating or convolving arrangement which is mainly analogue.

Yet another object of the invention consists in using an electro-acoustic arrangement which operates with acoustic surface waves.

The correlating arrangement according to the invention includes at least two memories, to store the signals to be correlated in the form of successive samples, means for reading out the samples from both stores simultaneously, respective means for modulating the amplitude and phase of a carrier frequency, or one of the two, by means of the samples read out, an electro-acoustic convolving arrangement which receives the two modulated carriers and emits their convolved product, and detection means to extract the modulation of the output signal of the electro-acoustic arrangement.

The use of an electro-acoustic convolving arrangement makes it possible to obtain the product of convolving the signals which are applied to its input in a single operation, whereas with digital processing it is only possible to achieve this result by performing the calculation point by point, that is to say for each sample of the output signal, when the length of time taken by calculation may be a hundred times longer than with the arrangement according to the invention.

The correlating arrangement according to the invention is thus capable of processing high-density signals. The input memories may act as buffers to smooth out the processing of the input information when it arrives at random times. It is thus possible to process the received signals in real time.

Amongst the possible applications of a correlating arrangement according to the invention, the sorting and identification of radar signals is one which calls for a high-processing speed. The received signals are correlated with a replica. The correlation may be performed on the temporal envelope or the phase of the signals, or on their spectral envelope. The processing capacity of the arrangement may be very high.

Figure 2:
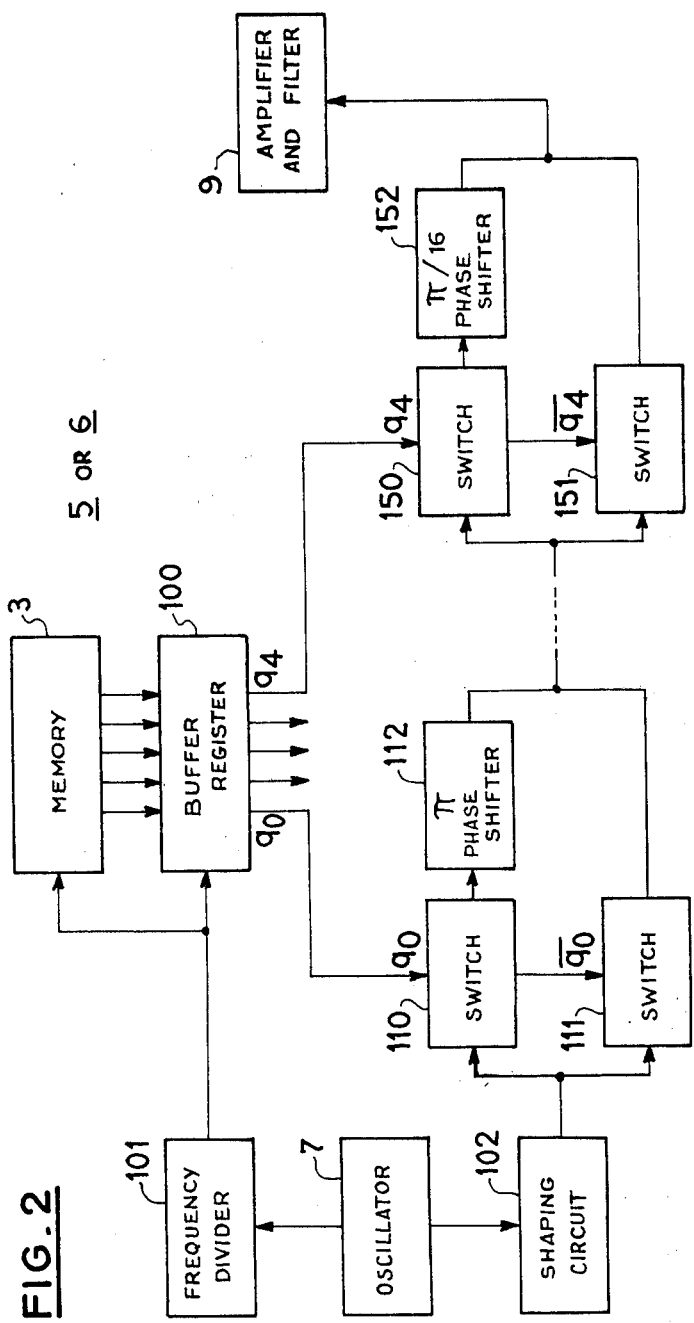
Figure 3:
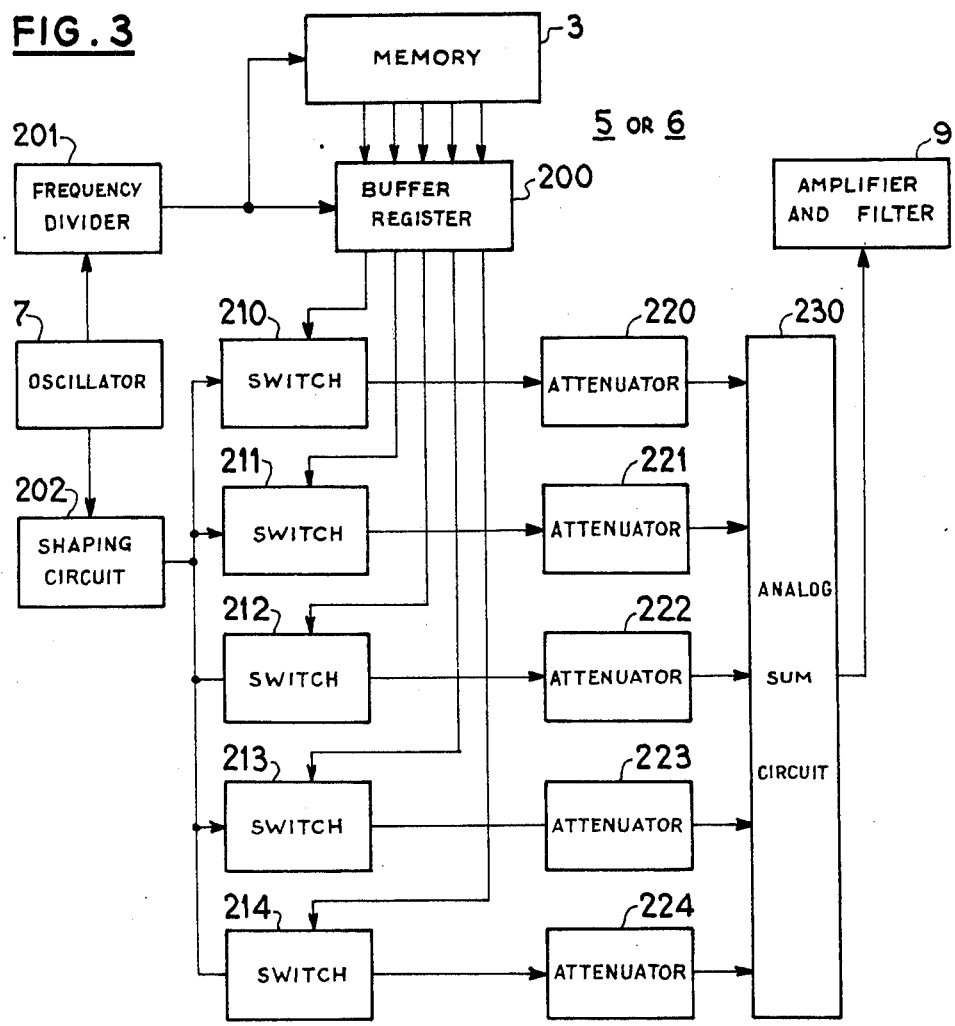
Figure 4:
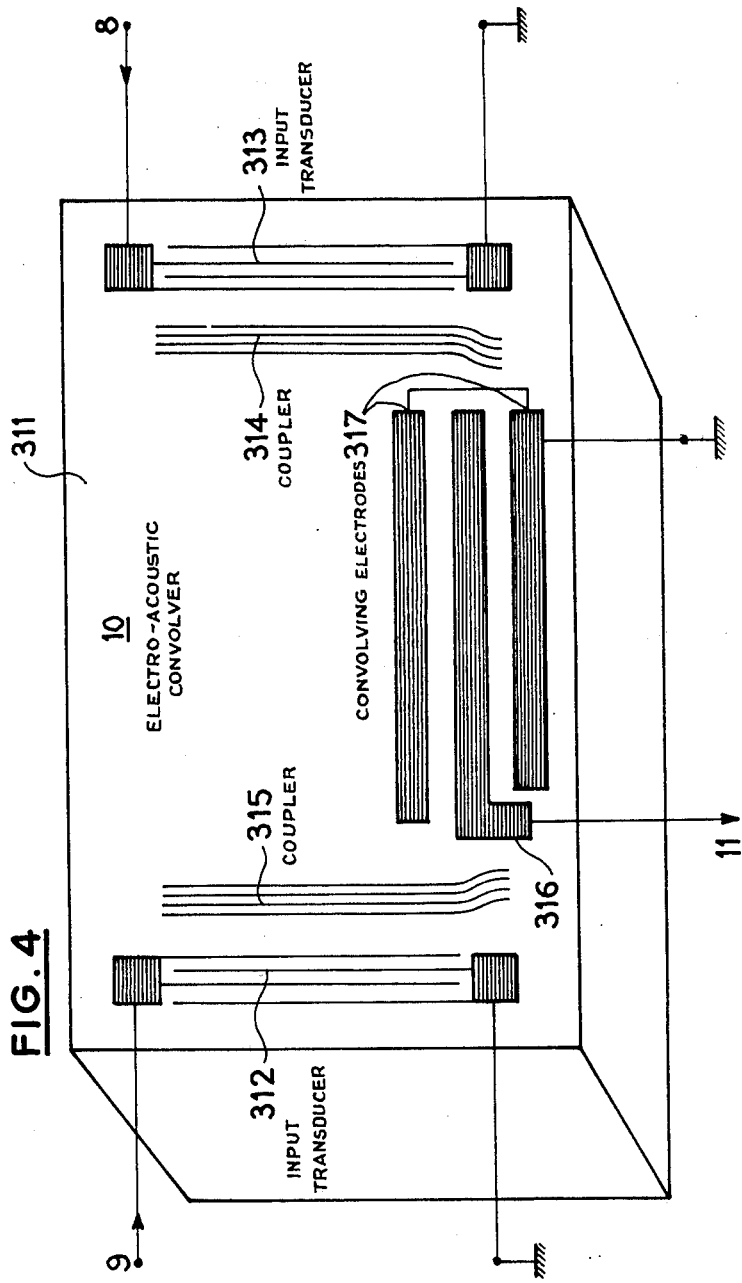
Figure 5:
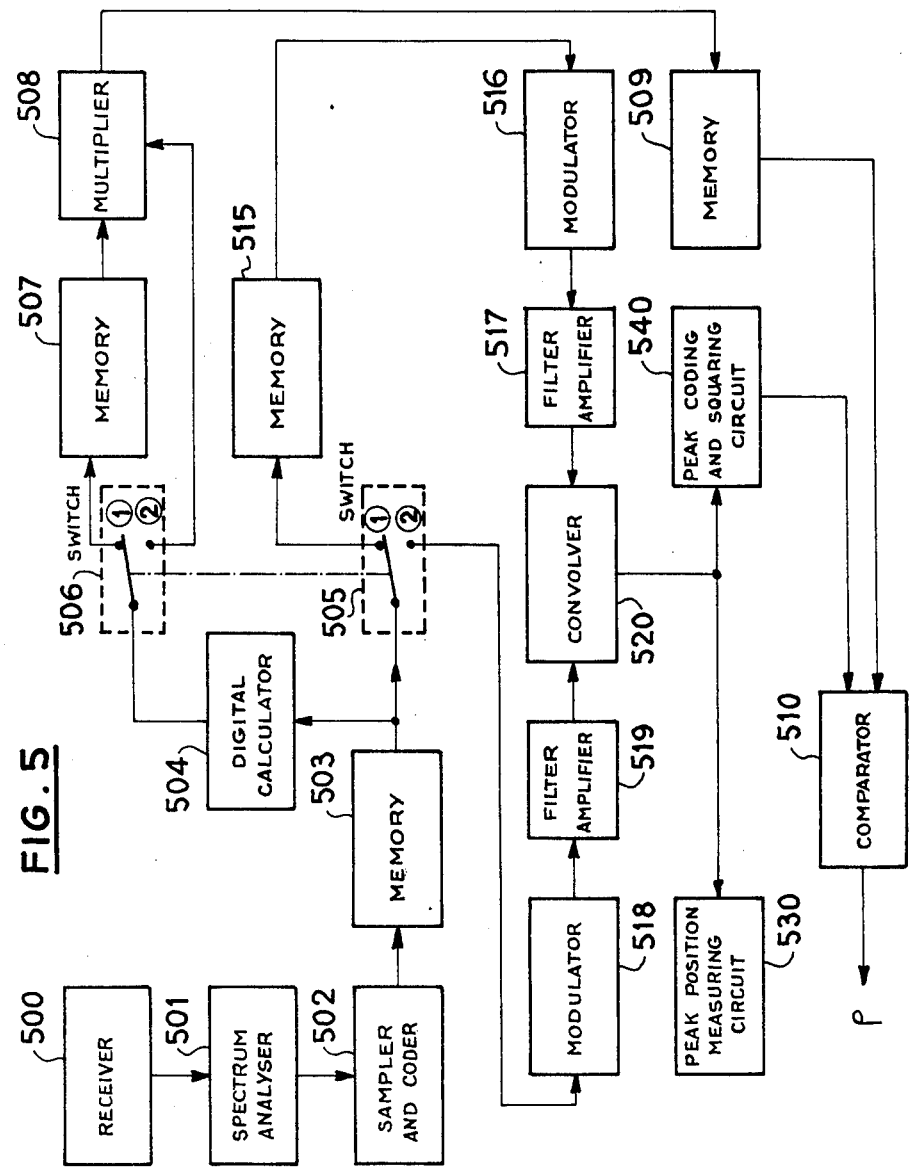

Other advantages and other features of the present invention will become apparent from the following description, which is given by way of non-limiting example. The Figures, which refer to the description, show:

FIG. 1, a general diagram of a correlating arrangement according to the invention, FIG. 2, an embodiment of phase modulator, FIG. 3, an embodiment of amplitude modulator, FIG. 4, an embodiment of convolver on a piezo-electric substrate, and FIG. 5, an example of an application to the processing of radar signals.

The following description concerns a high-speed correlator intended to operate with brief signals which have been sampled and coded beforehand. The high speed and wide pass-band performance of the system make it particularly suited to high-speed processing. The central constituent part of the correlator is an electro-acoustic convolver which has a high pass-band-/delay time product (of the order of 600) and a dynamic for its usuable output signals of approximately 40 dB.

Because what is involved is a convolver, two signals can only be correlated by reversing the time scale of one of the signals applied to the convolver. This is possible because the two signals to be correlated are first stored in the form of a series of samples. At read out, the samples from one of the signals are read out in the reverse order from that in which they were read in. Each of the analogue signals is then reconstituted in the form of a modulation of the phase and/or amplitude of a carrier, the modulated carrier then being applied to the convolver.

The parameters which are extracted at the output of the correlating arrangement are the height, the position and possibly the width of the correlation peak. They provide information on the resemblance between the correlated signals and, broadly speaking, on the origin and nature of these signals.

If the input signals are presented to the arrangement in their original temporal form, measuring the position of the centre of the correlation peak from a predetermined origin gives the temporal displacement between the two signals. This measurement may be used for example to locate a radio-electric source in cases where the same signal is passed through two different reception channels (a hyperbolic arc is then defined on which the source is located). The width of the peak and its height provide an indication of the accuracy and quality of the measurement.

If what is presented to the correlating arrangement to represent the input signals is their spectral evelope, for example in the form in which it comes from an instantaneous dispersive-line spectrum analyser, measuring the position of the centre of the correlation peak from a predetermined origin gives the difference in frequency between the input signals. The accuracy of the measurement is given by the width of the peak.

A general diagram of the correlator is shown in FIG. 1.

Signals which are supplied by a receiver 1, for example, are applied to a sampling and coding circuit 2. Each of the received signals is chopped into a series of samples, coded into digital form and recorded in one of the two memories 3 and 4.

A synchronising circuit 16 controls the read-out from both memories 3 and 4 simultaneously and in particular controls the time inversion, by reading out one of the stored series of samples in reverse order. This is equivalent to inversion of the time axis of one of the signals.

An oscillator 7 produces a cyclic signal which is used as a carrier for the signals to be correlated. Two modulators 5 and 6 modulate the said carrier using the binary information read out from the memories. Amplifying and filtering circuits 8 and 9 eliminate harmonics of the carrier and noise due to quantization. The convolver 10 receives the analogue signals supplied by circuits 8 and 9 and is followed by an amplifying, filtering and detecting circuit 11.

A circuit 12 for measuring the position of the centre of the correlation peak is connected to the output of circuit 11. It operates with the synchronising signals supplied by circuit 16. A circuit 13 for evaluating the peak amplitude (or amplitude and width), and for coding and shaping if required, is also connected to the output of circuit 11 and to the synchronising circuit 16. The information supplied by evaluating circuit 13 becomes available at an output terminal 14. The information from circuit 13 relating to the position of the peak becomes available at an output 15.

The input memories 3 and 4 store the quantized samples of the signals. As an example, memories having a capacity of 256 samples each of five bits may be used, which represents an input dynamic of 30 dB. The fastest sampling rate may be of the order of 20 nanoseconds.

It is possible to provide pre-processing circuits with the memories.

In certain applications, and particularly when the correlator is intended to enable signals to be identified by comparing them with a reference signal or signals, these pre-processing circuits may operate in parallel with the read-out from the memories to calculate the energy of the signals so as to allow the correlation coefficient obtained at the output from the convolver to be standardised. An embodiment of such circuits will be described further on in the description. This operation could also be performed by auto-correlation of the signals using the convolver, although it would involve a loss of processing time.

In other applications, the pre-processing circuits may also boost the information which is useful for identification purposes in order to increase the correlation gain (which amounts to enlarging the pass-band of the signals).

Finally, in other applications, the pre-processing circuits may pre-filter the information by an averaging process adapted to the pass-band of the received signals.

The memories and pre-processing circuits may be produced for example from high-speed emitter-coupled logic circuits (ECL techniques). Read-out may be synchronised by clock signals obtained from the local oscillator 7.

The modulators 5 and 6, which are associated with the local oscillator 7 which operates at the centre frequency of the convolver 10, enable the input signals, which are presented in the form of binary samples, to be correlated.

FIG. 2 shows an embodiment of phase-modulator and FIG. 3 shows an embodiment of amplitude-modulator. The common principle on which these two kinds of modulator operate is to divide the reference signal of frequency Fo supplied by the local oscillator 7 amongst $n$ channels or $n$ individual modulators ($n$ being the number of bits characteristic of the input samples). Each channel contains a switch, which may be formed from ECL logic gates, and an attenuator or phase-shifting circuit depending upon whether the modulation used is of amplitude or phase. The amounts of attenuation or phase shift applied by the attenuators or phase-shifters follow a ratio-of-2 geometrical progression from one channel to the next to enable the binary digital code to be converted into an analogue modulated signal.

The phase modulator shown in FIG. 2 has a buffer register 100 connected to one of the memories (3 in the case of modulator 5 and 4 in the case of modulator 6). This register is useful to ensure positively that the information being processed is in phase at the output from the various components and also to optimise the processed throughput of the signals applied to the convolver. The transfer of information from the input memory to the buffer memory 100 is controlled from the local oscillator 7, which operates at the centre frequency Fo of the convolver. A frequency divider 101 provides the control signals for buffer register 100 and for memories 3 and 4. The signal supplied by oscillator 7 is applied to a highspeed shaping circuit 102 which may be produced by ECL techniques. This circuit converts the sine wave from the oscillator into a binary square-wave signal whose fundamental frequency is Fo. This signal is applied to $n$ phase-shifting circuits or individual phase-shifters connected in series. The number $n$ of these circuits is equal to the number of bits in the input information. In the present embodiment this number is limited to five. Only the first and last circuits are shown. Each of these circuits produces an all or nothing phase-shift. The first circuit for example consists of two channels in parallel. The first channel, comprises, in series, a switch 110 which is controlled by output $q_0$ of the buffer register and a $\pi$ phase shifting circuit 112 which is formed by a predetermined length of co-axial guide for example. The second channel consists simply of a switch 111 controlled by output $\bar{q}_0$ of buffer register 100. The state of the first or most significant bit qo from the buffer register 100 thus determines whether the Fo signal passes to the out-of-phase channel (110, 112) of the first circuit or the in-phase channel (111). In the same way, the other four bits from the buffer register are allotted four other all-or-nothing phase-shifting circuits connected in series with the first circuit. These circuits apply respective phase-shifts of (0, $\pi/2$), then (0, $\pi/4$), then (0, $\pi/8$) and finally (0, $\pi/16$). Like the first circuit, the last circuit shown in the Figure has an out-of-phase channel which consists of a switch 150 controlled by output $q_4$ of the register in series with a $\pi/16$ phase shifter 152, and an in-phase channel consisting of a switch 151 controlled by output $\bar{q}_4$ of the register. If the buffer register 100 has only the outputs $q_0$ to $q_4$ and not the complementary outputs $\bar{q}_0$ to $\bar{q}_4$, it is easy to insert logic inverters between the outputs $q_0$ to $q_4$ and the switches 111 to 151 of the in-phase channels. The phase shift which can be obtained is thus quantized into 32 levels. The output of the last phase-shifting circuit is then connected to a filtering and amplifying assembly 9, whose centre frequency is $F_0$, to eliminate harmonics before applying the required signal to the convolver.

The amplitude modulator shown in FIG. 3 is based on the same principle of controlling individual modulators by means of a buffer register 200 which receives binary information from the associated input memory. This time, what are involved are $n$ attenuating channels connected in parallel which are grouped together at the inputs to an analogue summing circuit 230. Each of the attenuating channels consists of a switch (210 to 214) in series with an attenuator (220 to 224). The attenuation coefficients are in a ratio-of-2 geometrical progression. There are thus obtained thirty-two modulation levels for five bits. The signals applied to the switches are produced, from the local oscillator 7, by a shaping circuit 202 in the same way as for the phase modulator. In the present case all of the switches are fed in parallel. A frequency divider 201 provides the control signals for the buffer register 200. The output signal from the summing circuit 230 is applied to the filter and amplifier 9 and then to the convolver. Like the register 100 in FIG. 2, the buffer register 200 enables the signal to be more stable at the transitions by enabling the carrier to be chopped in synchronism by the binary elements.

An embodiment of the electro-acoustic convolver 10 is shown in FIG. 4. To obtain a high pass-band/delay-time coefficient, a piezo-electric beam-compressing structure with a three strip arrangement of output electrodes has been adopted.

Two input transducers 312 and 313 are designed in such a way as to have a maximum bandwidth centred on the frequency Fo, which is of the order of 150 Mhz. Two nonsymmetrical couplers 315 and 314, which act as acoustic beam compressors, and the convolving electrodes 316 and 317 are printed on a substrate 311 of lithium niobate ($LiNbO_3$).

The speed of propagation across the substrate is 3480 meters per second, which, for a useful length of approximately 40 mm, enables a delay time of 12 microseconds to be obtained.

The three strip configuration of the convolver electrodes enables the convolver to be produced by a so-called "planar" technique. This structure makes it easier to suppress interference volume echos, enables the output over-voltage coefficient to be reduced, and facilates impedance matching.

The output electrodes 316 and 317 are parallel and are orientated in the direction in which the acoustic waves are propagated across the substrate.

The printing on the substrate is performed by depositing aluminum through a resin mask produced by chemical etching.

A fuller description of such a convolver is given in an article by Ph. Defranould and C. Maerfeld, entitled "Acoustic Convolver using Multistrip Beamwidth Compressors" which was published in the American journal "1974 Ultrasonics Symposium — Proceedings of IEEE".

The input filtering circuits 8 and 9 and the output filtering circuit 11 are necessary for the convolver to operate satisfactorily. The purpose of the input filters is to eliminate the second harmonic of the applied signals. The purpose of the output filter, which is centred on 300 MHz and whose pass-band is twice the input pass-band, is to determine the output band and to reject the direct signal centred on 150 MHz at approximately 50 dB below the convolved signal.

The circuits for measuring the useful parameters of the correlation function which is obtained (the height and width of the peak and the position of the centre of the peak) which are shown in FIG. 1, are conventional.

The circuit 13 for evaluating the height of the peak may contain for example means for high-speed digital coding into seven binary elements whose accuracy is of the order of $10^{-2}$ near the maximum. In an identification application, where a received signal is compared to a reference signal by correlation, the height value needs to be weighted by amounts representing the energies of the signals as measured at the input to provide a standardised correlation coefficient.

The circuit 12 for measuring the position of the centre of the peak consists of means for comparing the correlation function with a threshold. With respect to a given origin, a mean between the points at which the threshold begins and ceases to be exceeded, gives the position of the centre of the peak.

When the height of the peak is not known in advance, a plurality of thresholds are arranged in steps to cover the dynamic of the output signal. Each of these thresholds has associated with it a digital counter which is driven by a synchronising signal from the time of origin. The frequency of the synchronising signal is divided by two when the relevant threshold is exceeded and the counter is blocked when it ceases to be exceeded. The result obtained thus provides a direct indication in clock periods of the position of the correlation peak with respect to the time origin supplied by the synchronising circuit 16. To prevent the taking of incorrect measurements from the side lobes or from correlation noise, logic circuits enable the measurement associated with the most suitable threshold to be selected as a function of the measured height of the correlation peak.

Within the limits of possible applications, the correlator may operate with signals of any type which have previously been stored in the input memories since synchronisation takes place at read-out.

The principal limits derive from the convolver and relate to the dynamic, delay time and accuracy which it is possible to obtain. The dynamic is limited by noise (approximately 30 to 50 dB). It is still adequate for a large number of applications. Given the length T of the integrating time of the convolver ($T \simeq 12 \mu s$), the correlated signals need to be of a length $\theta > T$. If the inspection of the correlation function takes place for a period $\pm \zeta$ around the origin, the duration $\theta$ of the signals to be correlated needs to be equal to at least $T + 2\zeta$.

The correlation arrangement which has just been described may be used to compare two pulsed signals which have been stored.

As mentioned above, the correlation may be performed on the temporal envelope of the phase of the signals or on their spectral envelope.

FIG. 5 shows an example in which the invention is applied to processing signals emitted by a receiver, after spectral analysis.

The signals supplied by the receiver 500 are applied to a dispersive-line spectrum analyser 501.

Of the spectral envelope of the sequentially received signals, the analyser 501 supplies only the modulus. Since its amplitude is not automatically unitary, it is necessary to standardise the correlation coefficient as a function of the energy of the applied signals.

With the circuit for calculating the correlation, which consists of two modulators 516 and 518, two filters and amplifiers 517 and 519, and electro-acoustic convolver 520 and measuring circuits 530 and 540 it is necessary to associate additional calculating circuits (or to use the correlator itself) and a memory 509 to calculate the standardised coefficient.

$$\rho = (E^2 (f \cdot g)/(E (f^2) \cdot E (g^2))$$

in which $E^2(f \cdot g)$ is the square of the amplitude of the peak obtained by correlating the frequency functions $f$ and $g$ which are successively emitted by the spectrum analyser 501, and $E(f^2)$ and $F(g^2)$ are the maxima of the auto-correlation products of signals $f$ and $g$ respectively, that is to say the energies of signals $f$ and $g$.

The signals $f$ and $g$ emitted by analyser 501 are sampled and coded into digital form by circuit 502 and are stored at 503 during processing. A digital calculating circuit 504 produces the value $E(f^2)$, which is stored at 507 by means of a changeover switch 506 which is in position 1. At the same time, signal $f$ is transferred to a memory 515 which will be read-out backwards during the correlation calculation performed by the arrangement according to the invention.

Signal $g$ is then read out from memory 503 at the same time as the changeover switches 506 and 505 are changed to position 2. The calculating circuit 504 produces $E(g^2)$, which is then applied, via changeover switch 506, to a multiplying circuit 508. This circuit also receives $E(f^2)$, which is read from memory 507, and supplies the product $E(f^2) \times E(g^2)$, which is recorded in memory 509.

At the same time, $g$, which is read from memory 503, is applied to convolver 520 via modulator 518 and filter 519, and $f$, which is read from memory 515 with a time reversal, is also transmitted to the convolver via modulator 516 and filter 517. The value $E^2(f \cdot g)$ is determined by a circuit 540 for peak detection, digital coding and squaring. The values $E^2(f \cdot g)$ and $F(f^2) \times (g^2)$ are applied to a comparator 510 which determines the standardised coefficient $\rho$.

A circuit 530 for measuring the off-centering of spectra $f$ and $g$, which is similar to the circuit shown in FIG. 1 for measuring the position of the peak, is also coupled to convolver 520.

The coefficient $\rho$ is theoretically equal to unity when function $g$ is proportional to function $f$.

The comparator 510 compares the value of $\rho$ with a predetermined threshold so as to identify $f$ and $g$.

When the value of $\rho$ is less than the threshold, this results in the signal which produced the function $g$ being rejected, whilst a value of $\rho$ higher than the threshold justifies the conclusion that $f$ and $g$ are identical.

To improve the discriminating ability, the correlation gain may be increased by performing pre-processing before correlation as indicated above. This pre-processing consists in widening the pass band of the spectral envelopes and boosting the information useful for identification purposes.

Given the fluctuations caused by sampling and quantizing and by the convolver itself, the system is able to operate with a threshold for comparison with the coefficient $\rho$ of close to 0.9, for a displacement of the correlation peak from the centre of less than $\pm 1$ $\mu$s. The range of signals which can be analysed is limited by the sampling in the case of short signals and by the accuracy of discrimination in the case of long signals.

Nevertheless, an interesting fact which may be pointed out is that for the entire correlation calculation (in which calculation the correlation function is obtained continuously) the correlator according to the invention takes no more time than the digital circuit 504 does to calculate a single point of the auto-correlation function. This clearly demonstrates the superiority of electro-acoustical circuits over conventional digital circuits.

The use of a high-speed correlator according to the invention thus has many advantages and opens up a large number of possibilities in the field of processing fast signals. In particular it enables signals to be processed in real time. The preferred field of application of such a correlator is to the treatment of radar signals but it is perfectly possible and desirable for it to find applications in other fields.

"Of course the invention is not limited to the embodiment described and shown which was given solely by way of example".

What is claimed is:

1. A high-speed correlating device for delivering an output correlation signal which is the result of the correlation of two input signals in the form of successive samples, comprising:
    at least a first and second memory for storing respectively samples of said two input signals;
    a synchronizing circuit for controlling the read out from said first and second memory simultaneously with a time inversion for the read out of one of said first and second memories;
    an oscillator for producing a carrier wave;
    first amplitude modulating means for modulating the amplitude of said carrier wave by using the information read out from said first memory, said first amplitude modulating means delivering a first analogue signal reconstituted in the form of a modulation of the amplitude of the carrier wave;
    second amplitude modulating means for modulating the amplitude of said carrier wave by using the information read out from said second memory, said second amplitude modulating means delivering a second analogue signal reconstituted in the form of a modulation of the amplitude of the carrier wave;
    an electroacoustical convolver device for receiving the respective first and second analogue signals; and
    means for filtering and detecting the modulation of the output signal from the convolver and delivering said output correlation signal.

2. A correlating device according to claim 1, wherein each of said first and second amplitude modulating means comprises $n$ individual amplitude modulators which are controlled in all-or-nothing operation, by respective ones of the $n$ bits of each read-out sample, a summing circuit having $n$ inputs, intended to emit the modulated signal, said individual modulators being connected between said oscillator and respective ones of the $n$ inputs of said summing circuit, the amount of modulation applied by the individual modulators following a ratio-of-2 geometric progression.

3. A correlating device according to claim 2, wherein each of said individual amplitude modulators comprises an attenuator circuit and a switch in series with said attenuator, said switch being controlled by one of the bits of the read-out sample applied to the amplitude modulating means.

4. A correlating device according to claim 2, wherein each of said first and second amplitude modulating means further comprises an input buffer register.

5. A high-speed correlating device for delivering an output correlation signal which is the result of the correlation of two input signals in the form of successive samples, comprising:
    at least a first and second memory for storing respectively said two input signal samples;

a synchronizing circuit for controlling the read out from said first and second memory simultaneously with a time inversion for the read out of one of said first and second memories;

an oscillator for producing a carrier wave;

first phase modulating means for modulating the phase of said carrier wave by using the information read out from said first memory, said first phase modulating means delivering a first analogue signal reconstituted in the form of a modulation of the phase of the carrier wave;

second phase modulating means for modulating the phase of said carrier wave by using the information read out from said second memory, said second phase modulating means delivering a second analogue signal reconstituted in the form of a modulation of the carrier wave;

an electroacoustical convolver device for receiving the respective first and second analogue signal; and means for filtering and detecting the modulation of the output signal from the convolver and delivering said output correlation signal.

6. A correlating device according to claim 5, wherein each of said first and second phase modulating means comprises $n$ individual phase modulators which are controlled in all-or-nothing operation by respective ones of the $n$ bits of each read-out sample, said individual modulators being connected in series, the first of them for receiving the carrier wave produced by the oscillator, the last of them for delivering the modulated wave, the amount of modulation applied by the individual modulators following a ratio-of-2 geometric progression.

7. A correlating device according to claim 6, wherein each of said individual phase modulators, comprises two channels connected in parallel, the first channel comprises two channels connected in parallel, the first channel comprising a first switch controlled by one of the bits of the read-out sample applied to the phase modulating means and a phase-shifting circuit in series with said first switch and the second channel comprising a second switch controlled by the complement of the same bit applied to the first switch.

8. A correlating device according to claim 6, wherein each of said first and second phase modulating means comprises an input buffer register.

9. A high-speed correlating device for delivering an output correlation signal which is the result of the correlation of two input signals in the form of successive samples, comprising:

at least a first and second memory for storing respectively said two input signal samples:

a synchronizing circuit for controlling the read out from said first and second memory simultaneously with a time inversion for the read out of one of said first and second memories;

an oscillator for producing a carrier wave;

first modulating means for modulating said carrier wave by using the information read out from said first memory, said first modulating means delivering a first analogue signal reconstituted in the form of a modulation of the carrier wave;

second modulating means for modulating said carrier wave by using the information read out from said second memory, said second modulating means delivering a second analogue signal reconstituted in the form of a modulation of the carrier wave;

an electroacoustical convolver device for receiving the respective first and second analogue signal; and means for filtering and detecting the modulation of the output signal from the convolver and delivering said output correlation signal.

* * * * *